United States Patent [19]

Al-Farsy

[11] Patent Number: 5,203,091

[45] Date of Patent: Apr. 20, 1993

[54] CALIPER APPARATUS

[76] Inventor: Salah M. Al-Farsy, c/o Oman Aviation Services Co. P.O. Box 1034, Seeb Central Post, Muscat, Sultanate of Oman,

[21] Appl. No.: 881,200

[22] Filed: May 11, 1992

[51] Int. Cl.⁵ .............................................. G01B 3/16
[52] U.S. Cl. ............................... 33/558.3; 33/558.01; 33/807; 33/DIG. 1
[58] Field of Search ............. 33/558.01, 558.04, 558.2, 33/558.3, 558.4, 783, 807, 808, DIG. 1

[56] References Cited

U.S. PATENT DOCUMENTS

| | | | |
|---|---|---|---|
| 99,961 | 2/1870 | Star | 33/558.01 |
| 396,479 | 1/1889 | Green | 33/808 |
| 1,129,699 | 2/1915 | Ludwig | 33/807 |
| 1,626,540 | 4/1927 | Kimura | 33/807 |
| 2,402,000 | 6/1946 | Young | 33/558.3 |
| 3,512,261 | 5/1970 | Viollet | 33/DIG. 1 |

FOREIGN PATENT DOCUMENTS 0197534  5/1923  United Kingdom ............... 33/558.4

OTHER PUBLICATIONS

Popular Science, "Dual-indicating caliper has metric scales", Nov. 1970, p. 103.
"Planar Gauge", Trend-Lines Catalog No. 502C, Chelsea, Mass. p. 18 (no date).

Primary Examiner—William A. Cuchlinski, Jr.
Assistant Examiner—Alvin Wirthlin
Attorney, Agent, or Firm—Leon Gilden

[57] ABSTRACT

A caliper arrangement includes a first leg member pivotally mounted to a second leg member. The first leg member includes a C-shaped first leg in confronting relationship in a coplanar orientation relative to a C-shaped second leg. The pivot axle pivotally mounting the first leg member and the second leg member has the first leg member including a first leg extension leg formed with an extension leg arcuate plate, with the arcuate plate arranged concentric relative to the axle, with the second leg member including an indicator leg cooperative with the arcuate plate for indication of radial displacement of the first leg relative to the second leg upon measuring of an outer surface of a workpiece. A modification of the invention includes replacement first and second leg members having sleeves having their lower distal ends projecting laterally and exteriorly of the first and second leg members respectively for interior measurement of a workpiece.

3 Claims, 4 Drawing Sheets

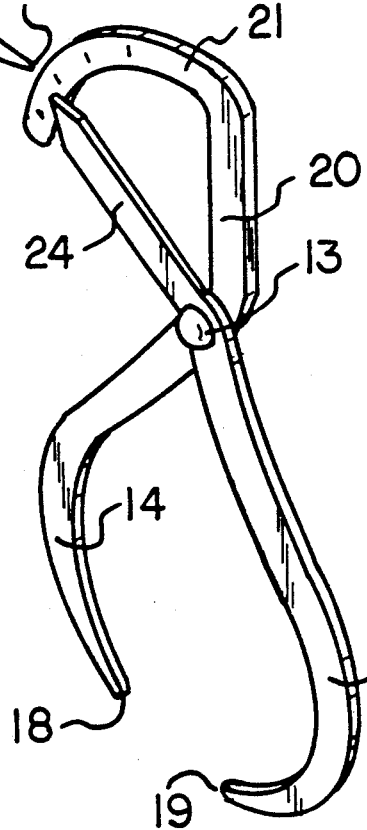

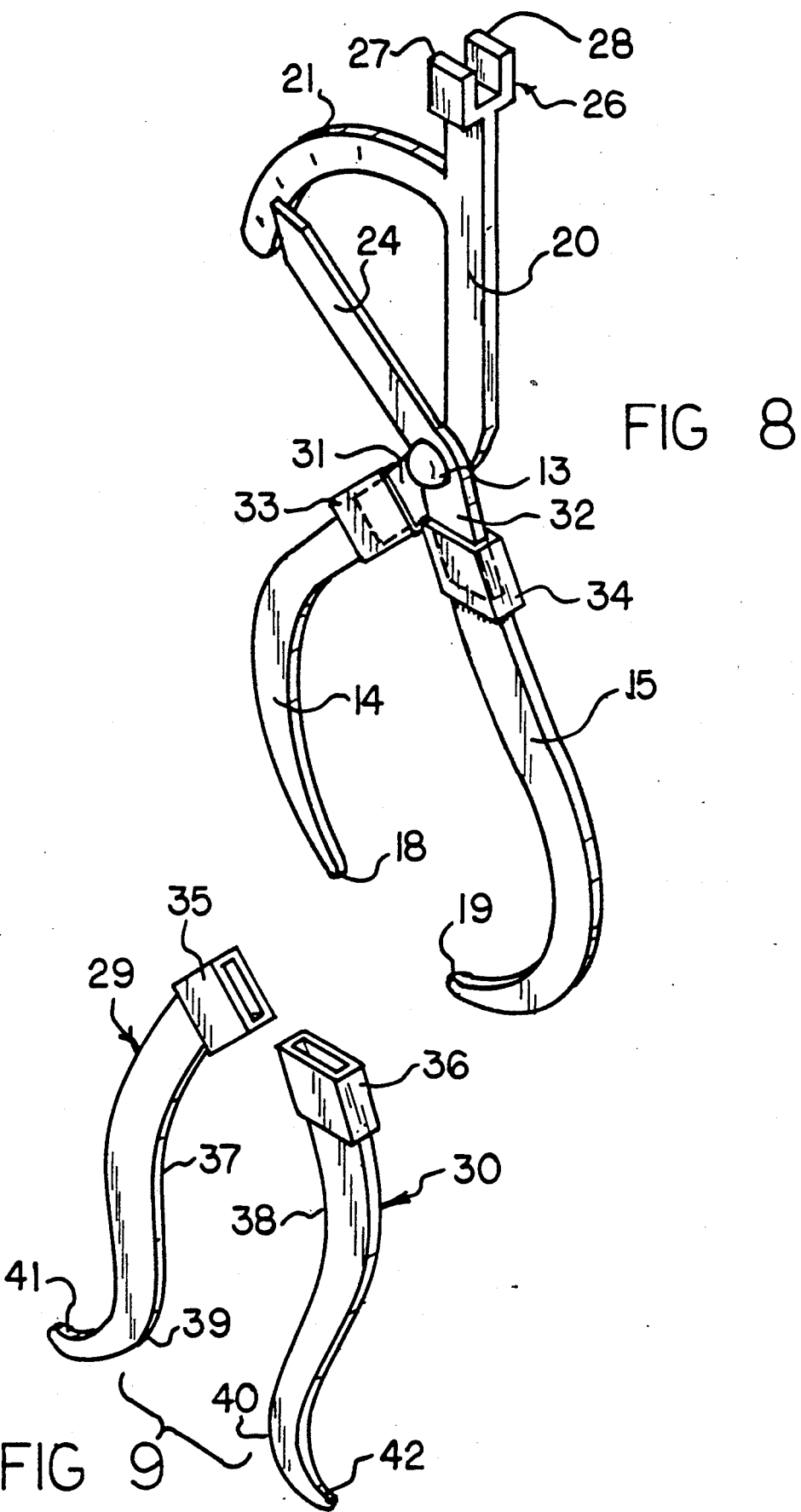

CALIPER APPARATUS

BACKGROUND OF THE INVENTION

1. Field of the Invention

The field of invention relates to caliper apparatus, and more particularly pertains to a new and improved caliper apparatus wherein the same permits ease of manipulation and use in measurement of workpiece components.

2. Description of the Prior Art

Various caliper apparatus of various types have been utilized throughout the prior art and exemplified in U.S. Pat. Nos. 4,956,952; 4,606,128; 4,897,931; 4,843,721; and U.S. Pat. No. DES. 271,185.

Accordingly, the prior art has typically been of a complex configuration and typically limited to either interior or exterior measurements of workpieces, wherein the instant invention attempts to overcome deficiencies of the prior art by providing for an organization of ease of use as well as effectiveness in construction in permitting the accurate and conveniently utilized measurement of outer or interior dimensions relative to a workpiece and in this respect, the present invention substantially fulfills this need.

SUMMARY OF THE INVENTION

In view of the foregoing disadvantages inherent in the known types of caliper apparatus now present in the prior art, the present invention provides a caliper apparatus wherein the same employs a first leg pivotally mounted to a second leg in a scissor-like orientation to permit ease of utilization in the measurement of interior and exterior dimensions of a workpiece. As such, the general purpose of the present invention, which will be described subsequently in greater detail, is to provide a new and improved caliper apparatus which has all the advantages of the prior art caliper apparatus and none of the disadvantages.

To attain this, the present invention provides a caliper arrangement including a first leg member pivotally mounted to a second leg member. The first leg member includes a C-shaped first leg in confronting relationship in a coplanar orientation relative to a C-shaped second leg. The pivot axle pivotally mounting the first leg member and the second leg member has the first leg member including a first leg extension leg formed with an extension leg arcuate plate, with the arcuate plate arranged concentric relative to the axle, with the second leg member including an indicator leg cooperative with the arcuate plate for indication of a radial displacement of the first leg relative to the second leg upon measuring of an outer surface of a workpiece. A modification of the invention includes replacement first and second leg members having sleeves having their lower distal end projecting laterally and exteriorly of the first and second leg members respectively for interior measurement of a workpiece.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved caliper apparatus which has all the advantages of the prior art caliper apparatus and none of the disadvantages.

It is another object of the present invention to provide a new and improved caliper apparatus which may be easily and efficiently manufactured and marketed.

It is a further object of the present invention to provide a new and improved caliper apparatus which is of a durable and reliable construction.

An even further object of the present invention is to provide a new and improved caliper apparatus which is susceptible of a low cost of manufacture with regard to both materials and labor, and which accordingly is then susceptible of low prices of sale to the consuming public, thereby making such caliper apparatus economically available to the buying public.

Still yet another object of the present invention is to provide a new and improved caliper apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view of the first leg member.

FIG. 4 is an orthographic view of the second leg member.

FIG. 5 is an orthographic top view of the axle member.

FIG. 6 is an orthographic side view of the axle member.

FIG. 7 is an isometric illustration of the invention.

FIG. 8 is an isometric illustration of a modified aspect of the invention.

FIG. 9 is an isometric illustration of the third and fourth legs utilized interchangeably with first and second legs of the invention.

DESCRIPTION OF THE PREFERRED EMBODIMENT

Figure 1:
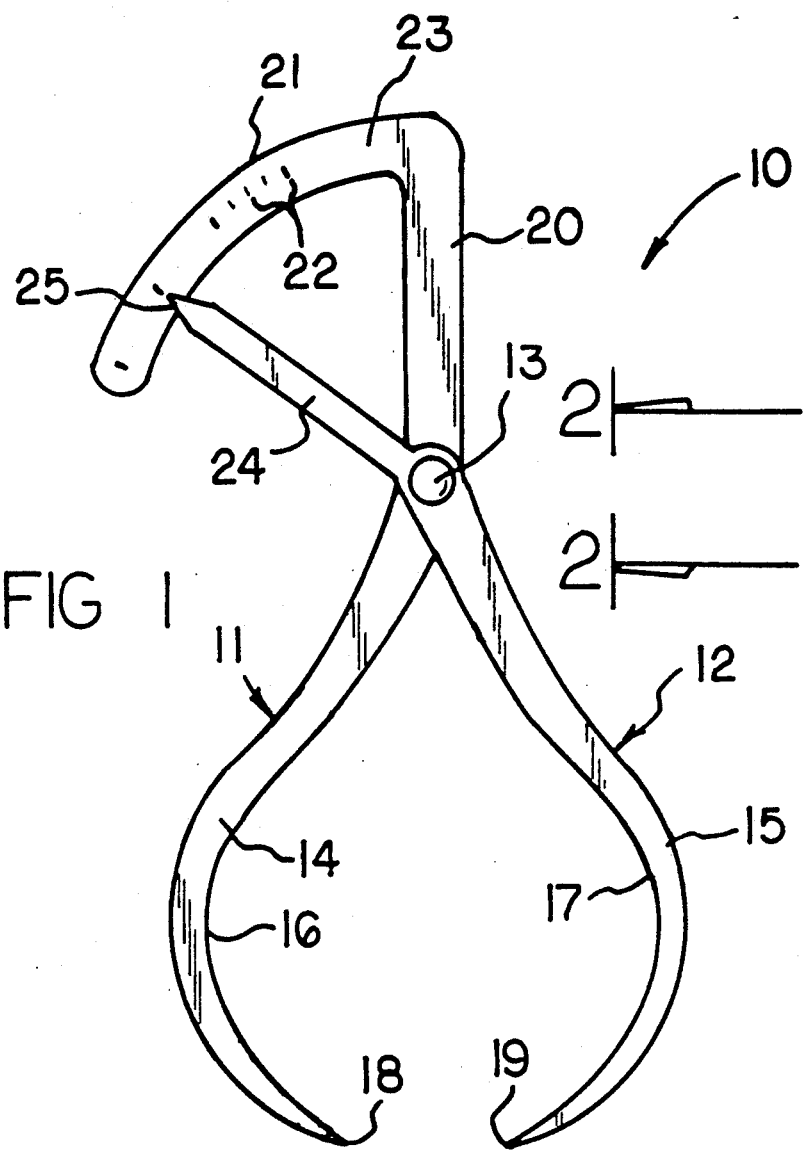
FIG. 1 is an orthographic view of the instant invention.
Figure 2:
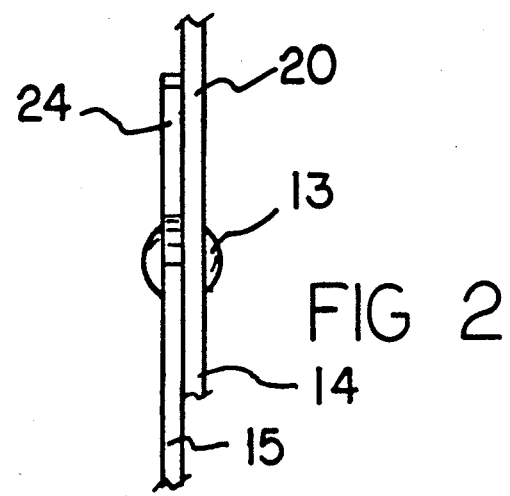
FIG. 2 is an orthographic view, taken along the lines 2—2 of FIG. 1 in the direction indicated by the arrows.

With reference now to the drawings, and in particular to FIGS. 1 to 10 thereof, a new and improved caliper apparatus embodying the principles and concepts of the present invention and generally designated by the reference numeral 10 will be described.

More specifically, the caliper apparatus 10 of the instant invention essentially comprises a first leg member 11 pivotally mounted in a scissor-like orientation relative to a second leg member 12. The first leg member and the second leg member include a pivot axle 13 orthogonally directed through the first leg member and the second leg member. A first C-shaped arcuate lower leg 14 is arranged in a parallel relationship relative to a C-shaped second arcuate lower leg 15. The first lower leg 14 includes a first concave side wall 16 in confronting relationship relative to the second concave side wall 17. A first leg lower distal end 18 is radially spaced from the pivot axle 13 a predetermined spacing equal to the predetermined spacing of a second leg lower distal end 19 arranged for effecting measurement of an outer dimension of a work component (not shown). A first leg extension leg 20 extends beyond the axle 13 relative to the first leg 14, with an extension leg arcuate plate 21 integrally mounted to the extension leg 20 and is concentric about the axle 13 having gradations 22 formed to an arcuate plate top surface 23. A second leg indicator plate 24 positioned above the second lower leg 15 has a pointed free end 25 positioned above the arcuate plate 21. It should be noted that the second leg extension leg 24 and the second lower leg 15 are coplanar, as are the first lower leg 14 with the first leg extension leg 20 and the associated extension leg arcuate plate 21.

It should be noted therefore that radial displacement of the first and second lower legs 14 and 15 relative to one another effects radial displacement of the second leg indicator leg 24 relative to the arcuate plate 21 to effect reading of relative displacement of the pointed free end 25 relative to the gradations 22.

Figure 10:
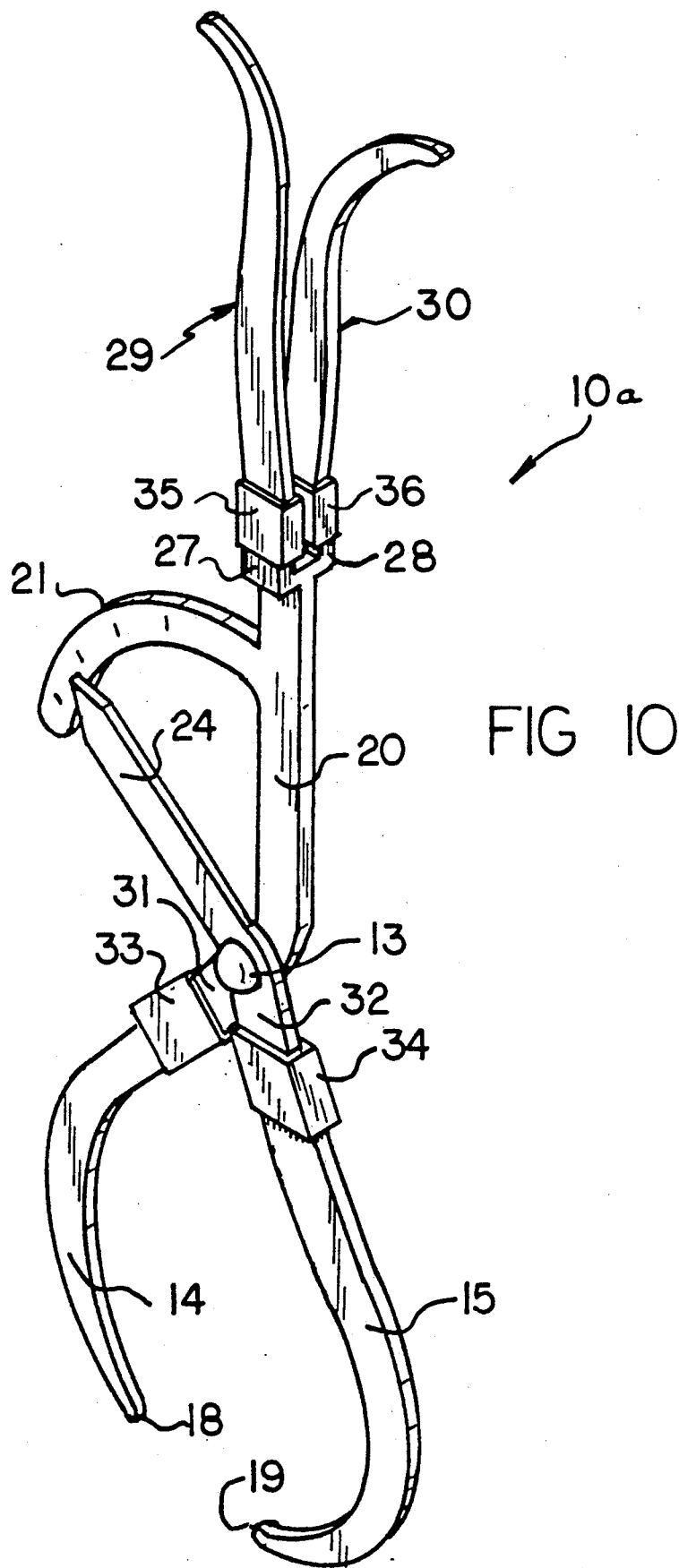
FIG. 10 is an isometric illustration of the modified aspect of the invention in an assembled configuration.

A modified apparatus 10a is illustrated in the FIG. 10 having an extension leg bifurcated head mounted to an upper distal end of the extension leg 21. The bifurcated head includes respective first and second parallel flanges 27 and 28 arranged for selective mounting of the first and second legs 14 and 15, that in turn have respective first and second leg sleeves 33 and 34 formed thereon for reception of associated first and second leg stub plates 31 and 32 of the first and second leg members 11 and 12 below the axle 13 on an opposed side from the extension leg 20 and the second leg indicator leg 24. Similarly, third and fourth legs 29 and 30 are provided with associated third and fourth leg sleeves 35 and 36.

The use of a third and fourth leg 29 and 30 are each of a generally S-shaped configuration, as illustrated in FIG. 9 for example, with the third and fourth legs including respective third and fourth leg concave interior side portions 37 and 38 that are in confronting relationship when the third and fourth legs are mounted to the first and second leg stub plates 31 and 32. Third and fourth leg convex interior portions 39 and 40 are positioned in confronting relationship relative to one another for providing transition to associated third and fourth leg lower free ends 41 and 42 that project exteriorly and laterally of the third and fourth legs respectively for utilization of the third and fourth legs for interior measurements of various workpieces, such as tubular components and the like. Accordingly, it should be noted that first and second legs 14 and 15 of C-shaped configuration are used interchangeably with the third and fourth legs of S-shaped configurations for respective exterior and interior measurement of various workpiece components.

The sleeves 33, 34, 35, and 36 are typically formed of a ferromagnetic material arranged for securement to the ferrous metallic material of the first and second leg stub plates 31 and 32 respectively to permit ease of selective securement of the sleeves relative to the stub plates in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A caliper apparatus, comprising,
    a first leg member pivotally mounted relative to a second leg member in a scissor-like orientation, with the first leg member and the second leg member including a pivot axle orthogonally directed through the first leg member and the second leg member pivotally mounting the first leg member relative to the second leg member, and
    the first leg member including a C-shaped first arcuate lower leg, with the second leg member including a C-shaped second arcuate lower leg, the C-shaped first arcuate lower leg includes a first concave side wall in confronting relationship relative to a second concave side wall of the C-shaped second arcuate lower leg, the first lower leg includes a first leg lower distal end radially spaced from the pivot axle a predetermined spacing , with the C-shaped second arcuate lower leg including a second leg distal end spaced from the pivot axle said predetermined spacing, and the first leg member further including a first leg extension leg extending above the pivot axle, with the first leg extension leg including an extension leg arcuate plate mounted laterally of the first leg extension leg concentric about the pivot axle, with the extension leg arcuate plate including an arcuate plate top surface, the arcuate plate top surface including gradations imparted thereon, and the second leg member includes a second leg indicator leg integrally formed relative to the second arcuate lower leg, with the second leg indicator leg spaced above the pivot axle, with the second leg indicator leg including a pointed free end positioned above the arcuate plate top surface, and the first leg extension leg includes a bifurcated head extending above the extension leg arcuate plate, the bifurcated head includes a first flange parallel to a second flange, and the first leg member includes a first leg stub plate, the second leg member includes a second leg stub plate, with the first leg stub plate and the second leg stub plate oriented below the pivot axle, and the C-shaped first arcuate lower leg includes a first leg sleeve at an upper distal end of the C-shaped first leg arcuate lower leg spaced from the first leg lower distal end, and the C-shaped second arcuate leg includes a second leg sleeve formed to an upper distal end of the C-shaped arcuate lower leg spaced from the second leg lower distal end, with the first leg sleeve arranged for receiving the first leg stub plate, the second leg sleeve arranged for receiving the second leg stub plate.

2. An apparatus as set forth in claim 1 wherein the first leg sleeve and the second leg sleeve are formed of a ferrous magnetic material, and the first leg stub plate, the second leg stub plate, the first flange, and the second flange are formed of a ferrous metallic material.

3. An apparatus as set forth in claim 2 including an S-shaped third leg and an S-shaped fourth leg, the S-shaped third leg and the S-shaped fourth leg include respective third and fourth leg lower free ends, and third and fourth leg ferromagnetic sleeves spaced from the respective third and fourth leg lower free ends, with the third and fourth leg sleeves arranged for mounting to the first flange and the second flange respectively.

* * * * *